Oct. 23, 1962  J. R. M. GIRARD  3,059,526
LIGHT CONTROL DEVICE FOR CAMERAS
Filed Jan. 15, 1960  2 Sheets-Sheet 1

Inventor
Jean R. M. Girard
By Kenron, Palmer and Stewart

Oct. 23, 1962 J. R. M. GIRARD 3,059,526
LIGHT CONTROL DEVICE FOR CAMERAS
Filed Jan. 15, 1960 2 Sheets-Sheet 2
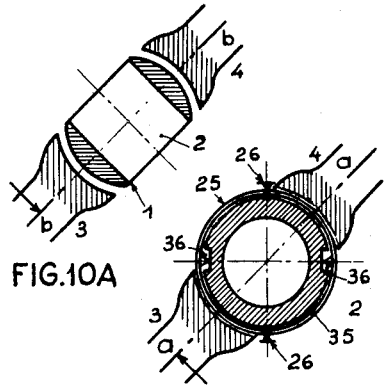
FIG.10A
FIG.10B
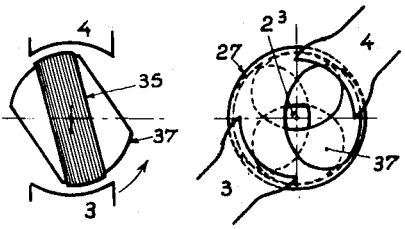
FIG.10D
FIG.10E
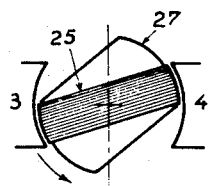
FIG.10C
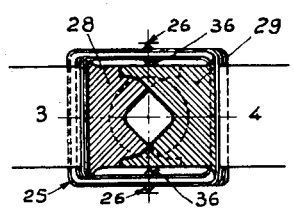
FIG.11A
FIG.11B
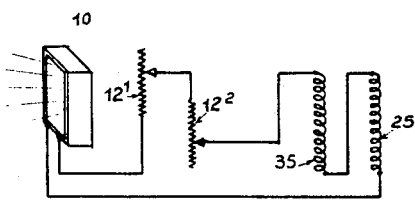
FIG.12
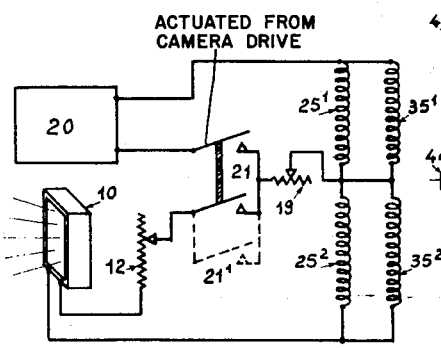
FIG.13
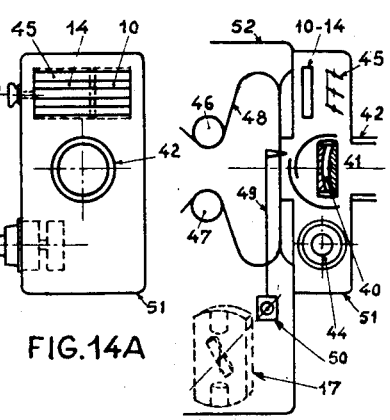
FIG.14A
FIG.14B
Inventor: Jean R. M. Girard
By: Kenyon, Palmer and Stewart

United States Patent Office

3,059,526
Patented Oct. 23, 1962

3,059,526
LIGHT CONTROL DEVICE FOR CAMERAS
Jean René Marie Girard, 4 Rue de Montmorency,
Boulogne-Billancourt, France
Filed Jan. 15, 1960, Ser. No. 2,735
Claims priority, application France Jan. 20, 1959
23 Claims. (Cl. 88—16)

The present invention concerns a light control device for cameras, mainly for kinematographic cameras.

The object of the invention is to so provide such a light control device that it may serve either as a shutter or as an automatic diaphragm, or both as a shutter and an automatic diaphragm in such cameras.

According to a feature of the invention, a light control device for cameras is mainly constituted by a galvanometer arrangement, the movable part of which is placed across the path of the light to the film with its deflection axis orthogonal to the direction of said path and the center of its central aperture coinciding with a point of the axis of said path, whereas the direction of the permanent magnet field of the arrangement is both perpendicular to the axis of the light path and the axis of deflection of the said movable part.

According to a further feature of the invention, said movable part is such that the shape of its aperture seen from the light passing through remains substantially homothetical to itself whatever the deflected position of the movable part.

According to a further feature of the invention, not necessarily used in all embodiments, the arrangement includes a fixed magnetic core provided with a light duct the axis of which coincides with the light path within the movable part of the device.

In a first example, the said movable part only comprises a single member comprising at least one winding coil on a supporting form and such an homothetic configuration of cross-section is obtained by providing extensions of the said form.

In a second example, said movable part comprises two members pivoted for opposite directions of displacement, either around a single axis or around separate direction axes; in the first case, extensions are also provided but in the second case the winding forms may be shaped for the required result.

When the two members have separate deflection axes, these axes are preferably made perpendicular and each at 45° to the direction of the magnetic field of the arrangement.

According to a further feature of the invention, each time the device acts as both a shutter and a diaphragm, two coils of electrically opposite interconnection are provided in the movable part, one coil driven by the shutter control current, the other coil driven by the automatic diaphragm control current. When two members are provided in the movable part, either of them may preferably comprise such a pair of form-supported coils, though it may be feasible that each form only carry a single coil and one form be devoted to the shutter operation and the other one to automatic diaphragm operation. Of course, as said, the two form device may be used for a sole operation, either as a shutter or as a diaphragm and solely provided for a better homothetic change of cross-section of the light path.

The control current for the automatic diaphragm may be supplied as usual from a photocell receiving the light from the scene. The shutter control current must be synchronized with the movement of the film and the source of current may be either a battery or a photocell delivering a relatively strong current even with low ambient light—in such cases the supply is merely interrupted by a contact in synchronism with the camera motor; or the current may come from an elementary rotating iron generator driven by the camera motor with or without half-wave rectification as the case may be.

Part of the lens system of the objective may be carried within the duct of the fixed magnetic core when provided in the device.

These and further features will be more fully disclosed with reference to the accompanying drawings, wherein:

FIGS. 10A to 10E show a modification the device with two forms of perpendicular axes;

FIG. 10A shows a top view of the magnetic circuit of this modification;

FIG. 10B shows a front view of the device with its coils, the optical duct being open;

FIGS. 10C and 10D respectively show top partial views of the device showing the outer and inner forms thereof;

FIG. 10E shows a front view of the complete device, with the optical duct partially closed.

FIGS. 11A and 11B show front and top views of a further modification of the device with two forms having the same axis of deflection, the optical duct being partially closed in such views;

FIG. 12 shows an electric circuit for controlling a two-form device as an automatic diaphragm;

FIG. 13 shows an electric circuit for controlling a two-form device both as a shutter and a diaphragm;

FIG. 14A shows a front view of device in a camera; and

FIG. 14B shows the same arrangement in a lateral view with partial cross-section of some parts thereof. This arrangement is only illustrative of the manner of mounting a device according to the invention in a camera.

Figure 1A:
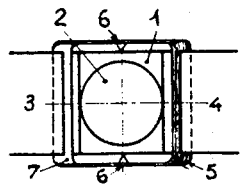
FIGS. 1A and 1B show respective front and top views of a simple form of a device according to the invention, the optical duct being open in the FIGURES.
Figure 2A:
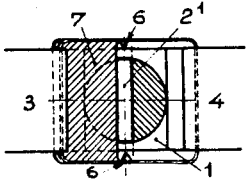
FIGS. 2A and 2B show similar views in a partially closed condition of the optical duct.
Figure 1B:
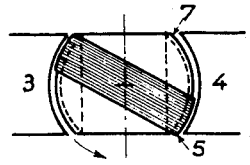
Figure 2B:
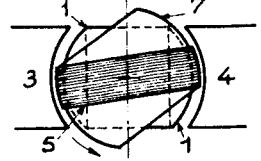

The location of a device according to the invention in a camera is shown at 41 in FIG. 14B. The optical duct 2 is shown cut in a core 1 in FIGS. 1A and 1B, for instance, and is inserted in the camera in the path of the light passing through the lens system thereof.

The magnetic core 1 is placed between polar flares 3 and 4 of a permanent magnet not otherwise shown. At least one form bearing at least one coil is mounted for turning around a deflection axis in the air gap between the core and the magnet poles each time it is fed with an electrical current. The pivoting is such that when the form rotates, it modifies the cross-section of the light passage therethrough.

Figure 3A:
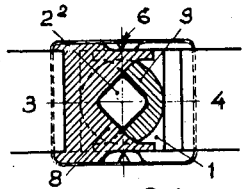
FIGS. 3A and 3B are similar views but further show the form extensions for shaping the cross-section of the duct.
Figure 3B:
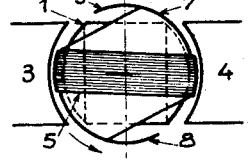

The simplest form of the device is shown in FIGS. 1A to 2B and will be used in actual practice as shown in FIGS. 3A and 3B. The coil is shown at 5 on a carrier or form 7 pivoted at 6 so that the member may be deflected around its axis within the twin air gap delineated by the polar flares 3 and 4 and the core 1. When, FIGS. 2A and 2B, the member is deflected, the passage of the light is reduced to a slit such as $2^1$. The closing may be complete for a greater deflection of the member.

Figure 5:
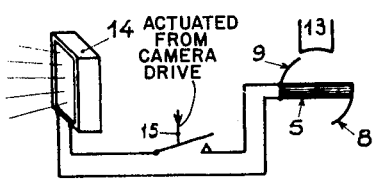
FIGS. 5, 6 and 7 show three electric circuits for the control of the device as a shutter.
Figure 6:
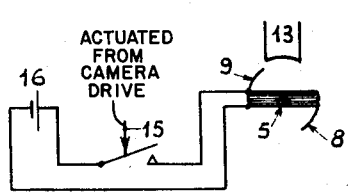

For operating this device as a shutter, the coil must be supplied with a pulsating electrical current synchronized with the movement of the film in the camera. A first means therefor is to supply the coil from a D.C. source such as a battery 16, FIG. 6, or from a photocell 14, FIG. 5, by a lead including an interruptor contact 15 which is operated by suitable means to open and close at the frequency of the movement of the film. When the photocell 14 is used, this photocell must be of relatively high sensitivity so that even in a low degree of light from the outside, the current is of sufficient value to completely close the optical duct 2.

Figure 7:
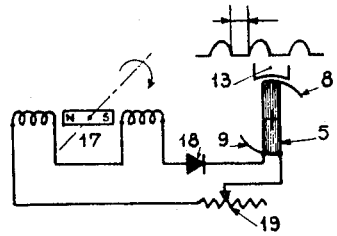

Another means is shown in FIGS. 7 and 14B and consists of a small A.C. generator the rotation of which is controlled by the movement of the film in the camera. This generator is of the rotating iron kind and is shown at 17. The A.C. current is rectified by a rectifier cell 18, and an adjustable resistor 19 is serially connected (potentiometer or rheostat) for adjustment of the value of said rectified current. The waveform is shown above the coil 5 as supplied to said coil. This halfwave rectification ensures an oscillating displacement of the movable member so that the shutter closes during the time intervals the film is moved. Limiting abutments may be provided for this oscillation if required. The coil could even be supplied with pure A.C. if the device is solely used as a shutter, provided the coil is able to completely rotate or at least to oscillate both ways synchronous with 17.

Figure 4:
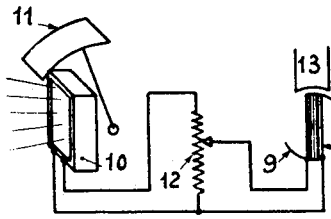
FIG. 4 shows an electric circuit for the control of the device as an automatic diaphragm.

For use of this device as an automatic diaphragm, the coil 5 must receive its control current from a photocell 10, FIG. 4, the current of which is at any time proportional to the light from the scene. A potentiometer 12 is inserted in the electrical lead for adjusting the diaphragm to the sensitivity of the film to be used. A further adjustment may be provided by means of an optical shutter 11 in front of the photocell 10. It must be noted that in FIG. 5, such a shutter may also be provided for adjusting the current controlling the shutter, if desired.

In FIGS. 4 to 7, a small additional magnet 13 is shown for "biasing" the magnetic circuit of poles 3 and 4 and consequently enable the adjustment of the direction of the permanent magnetic field of the device.

It is clear that in the elementary form of FIGS. 1A to 2B, the passage of the light through the device is of varying cross-section shape as the form is deflected. On the other hand, it would be advantageous that the cross-section remains in total homothety as the form is deflected and further that its shape presents such a symmetry with respect to its center point as the one having two orthogonal axes of symmetry with respect to this point. This is achieved according to FIGS. 3A and 3B by shaping the carrier or form 7 of the moving coil with front and back shuttle extensions 8 and 9 cut substantially as shown so that the cross-section $2^2$ permanently remains homothetical to itself and of a suitable symmetry with respect to its center point.

Figure 8:
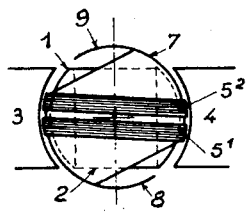
FIG. 8 is a top view of a modification of the device of FIGS. 1A to 3B for adapting it both to the shutter and the diaphragm operations.
Figure 9:
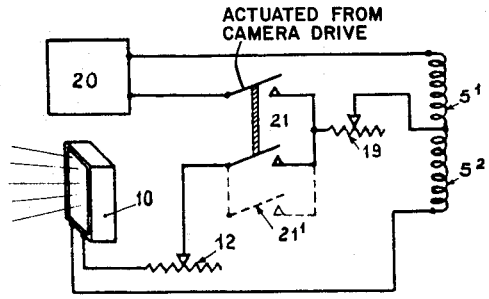
FIG. 9 shows an electric circuit for the device of FIG. 8.

Ecen with a single member device, both functions of shutter and diaphragm may be simultaneously performed, provided the coil of the member is divided into two coils $5^1$ and $5^2$, FIGS. 8 and 9 which are differentially connected from the electrical point of view, according to, for instance, the circuit diagram of FIG. 9. The coil $5^1$ acts as a shutter control, the coil $5^2$ acts as a diaphragm control in the electrical operation of the device. In FIG. 9, the source controlling the shutter operation is shown at 20 and is of the kind disclosed in FIGS. 5 and 6. A two blade switch 21 is considered as keyed or operated in synchronism with the movement of the film, as was the contact 15 in the said FIGS. 5 and 6. The diaphragm control current is generated from the photocell 10 through the adjusting potentiometer 12 as in FIG. 4. At $21^1$ is shown in dotted lines a manually operable switch enabling the operator, when desired, to close the circuit of the photocell 10 only to the coil $5^2$, switch 21 remaining open. $21^1$ is used for two purposes: firstly it will be closed during the operation determining the scaling of the response of the photocell 10; secondly, it serves the user, prior to the use of the camera, to check to see if the coil form, when $21^1$ is closed, really has a tendency to move in the direction of a closure of the optical duct 2 (since the device only acts as an automatic diaphragm). In this respect, an index, not shown may be associated with the frame and mounted on the camera box for observation by the user in such a check.

In the common return lead of the coils, is inserted an adjustable resistor 19, potentiometer or rheostat. This serves as a means for balancing the two circuits so that the relative values of both control currents in both coils may be preserved during an operation of calibration of the scale of operation of the device at the factory.

The operation is readily understandable. Each time switch 21 closes, between two movements of the film, coil $5^1$ is fed from the source 20 and opens the optical duct 2. Simultaneously coil $5^2$ is fed by the photocell current and, acting in reverse direction with respect to $5^1$, ensures a limitation of the opening of this duct 2 proportional to the response to light of the said photocell 10. The movement or deflection of the member is the result of these opposite actions, which is the twin shutter and diaphragm effect of the device.

If source 20 is of the kind shown in FIG. 7, viz. only providing current when the camera motor moves, the contact 21 may be omitted and also contact $21^1$ (the user will see the said index without having a push-button to depress).

Instead of making the device with a single member in the movable part, it is possible, and in certain points of view, preferred, to make it with two members deflected in reverse relative directions. Such an arrangement is shown in FIGS. 10A to 10E in one modification and in FIGS. 11A and 11B in another modification.

The arrangement of FIGS. 10A to 10E comprises two coils 25 and 35 respectively carried by supporting forms 27 and 37 separate and distinctly mounted on pivots at 26 and 36 so that these frames may rotate around respective axes which are perpendicular with respect to one another and with respect to the direction of the optical duct 2 in the core 1. The said axes are each at 45° with respect to the direction of the permanent magnetic field of the device, see mainly in this respect FIG. 10B. The carrier forms 27 and 37 are preferably shaped as portions of spheres and consequently, as visible in FIG. 10E at $2^3$, the cross-section of the light passage is substantially concentric to the axis of the light duct and of suitable shape for avoiding any extensions, such as 8 and 9 in FIG. 3B, in the said carrier forms. Of course, the magnetic core 1 is made as a portion of a sphere itself, see FIGS. 10A and 10B in this respect. Such an overall arrangement of the device, though somewhat elaborate, is better adapted for providing a good depth of the optical field.

In FIGS. 11A and 11B, the respective deflecting axes of the members coincide. Extensions 28 and 29 of the coil forms are then provided for shaping the optical aperture but, as these shutter extensions are now on the same side of the device, the optical quality is better than in the embodiment of FIGS. 3A, 3B. The manufacture is easier than that of FIGS. 10A to 10E.

Such a device as in FIGS. 10 and 11 may be used as a mere automatic diaphragm of improved performances with respect to the one of FIGS. 1 to 3. FIG. 12 shows a possible electrical circuit for this embodiment. The coils are for instance serially connected (it is also and equally feasible to connect said coils in parallel) in the circuit of the photocell 10. The potentiometer 12 is now divided in two portions $12^1$ and $12^2$, part $12^1$ being used, for instance, in the adjustment with respect to the speed of the camera, and part $12^2$, then, in the adjustment with respect to the sensitivity of the film emulsion.

When the device of FIGS. 10 and 11 must be solely controlled as a shutter, the coils are connected in series or in parallel with the source of control current.

When the device is used as both a shutter and a diaphragm, one of the members of the movable part may be used for one of these functions and the other one for the other of the said functions. The electric circuit may be that of FIG. 9, coil 25 being substituted for $5^1$ and coil 35 for $5^2$. Preferably then, the inner form serves as a shutter and the outer as a diaphragm, as the inner member may be lighter and consequently able to follow the synchronization control. Preferably further, the other form will be totally separated from the shutter control so that it may at any time freely follow the change of light of the scene.

It may be however of advantage for the balance of the actions in the device, to provide each of the two forms with a pair of coils electrically connected in relative opposition, so that each form will enter in the shutter action as well as in the diaphragm action, quite similarly to the single form of FIG. 8. The electric circuit may be the one shown in FIG. 13 and in this FIG. 13, the coils $25^1$ and $35^1$ are paralleled in one branch and the coils $25^2$ and $35^2$ in the other branch. They may also be serially connected. Apart from this connection, the scheme of FIG. 13 appears as a development of the circuit of FIG. 9 in all other respects. The same remarks concerning the switches as for FIG. 9 may be made for FIG. 13.

When provided the optical duct 2 of core 1 may, as said, be further used for housing part of the lens system of the camera. This is shown in FIG. 14B wherein this part of the lens system is shown at 40 within the light control device 41. The remaining part of the lens system is not shown, its housing being referred to as 42 in FIG. 14A. When such a scheme is used, part of the control arrangement and part of the lens system at least may be housed in a single and separate unit so as to constitute a portion of the camera the housing 51 which is locked to the housing 52 of the camera proper.

In such a unit, for instance, the photocells 10 and 14 (when this latter is provided) may be placed at the rear of a window and a sun-shade provided before them at 45 which the user may adjust by moving a button 43. On the housing and laterally for instance several knobs such as 44 may be provided for adjusting the various potentiometers and rheostats of the electric circuits as described. In FIG. 14B are shown the sprockets 46 and 47 and the film drive including pins such as 49. When, instead of the photocell 14, an A.C. generator is used for the shutter control, this member may be located as shown in dotted lines in 17 on FIG. 14B.

When the current from the photocell is to be amplified, transistor stages may be used or phototransistor cells may be substituted for ordinary photocells.

When the magnetic core is omitted, the carrier members of the coils are made of magnetic material.

Technological departures from the above remains in the field of the invention as defined in the following claims.

I claim:

1. A device for controlling the light passing in a camera from the lens system to the film, comprising a galvanometric arrangement having a movable part comprising at least one coil form carrying at least one electrical coil, said form being of opaque material and having a light aperture formed through the central portion thereof, said aperture having its center coinciding with a point of the light path from the lens to the film and its axis of deflection perpendicular to said path, and a permanent magnet circuit establishing a magnetic field in a direction orthogonal to said light path and passing through said coil.

2. A device according to claim 1, wherein a fixed magnetic core provided with a light duct coaxial to the light path is mounted within the said coil form.

3. A device according to claim 2, wherein part at least of the lens system is carried within the said duct.

4. A device according to claim 1, wherein the form carrying the coil is at least partly made of magnetic material.

5. A device according to claim 1, wherein the movable part comprises a single form carrying two oppositely connected coils, and means supplying separate control current to said coils.

6. A device according to claim 1, wherein the movable part of the device comprises two coil forms separately mounted for independent deflections, each form carrying at least one electrical coil.

7. A device according to claim 6, wherein the coil forms have their deflection axes coincident.

8. A device according to claim 6, wherein the coil forms have their deflection axes relatively perpendicular.

9. A device according to claim 8, wherein the said deflection axes are each at 45° with respect to the direction of the magnet field.

10. A device according to claim 6, wherein each frame carries two oppositely connected coils.

11. A device according to claim 1, and including a photocell supplying control current to said coil.

12. A device according to claim 11, wherein said photocell is arranged to measure the light seen through the lens system of the camera and the control current varies in accordance with said light.

13. A device according to claim 11, and including means to key the control current from the photocell in synchronism with the film drive in the camera.

14. A device according to claim 1, wherein the movable part includes at least one coil supplied from a battery through a keying contact actuated from the camera drive.

15. A device according to claim 1, wherein the movable part includes at least one coil supplied with the half-wave rectified current from a small rotating-iron generator actuated by the film drive.

16. A device according to claim 1, wherein the movable part may freely rotate completely and includes at least one coil supplied with alternating current from a small A.C. rotating generator controlled from the film drive.

17. A device according to claim 1, wherein the movable part comprises at least two coils acting in relative electrical opposition, means supplying current to one of said coils from a light metering photocell, and means supplying current to the other coil keyed at the frequency of the film drive.

18. A device according to claim 17, wherein the movable part comprises two coil forms each carrying two coils in oppositely connected relation.

19. A device according to claim 1, wherein the aperture in said form is shaped for maintaining a permanently substantially homothetic cross-section to the light path.

20. A device according to claim 19, including a single form provided with front and rear shutter extensions having edges of complementary forms, symmetrical with respect to a direction perpendicular to the magnetic field.

21. A device according to claim 19, including a pair of coil forms having coinciding deflection axes, each form being provided at its front side with a shutter extension symmetrical with respect to a direction perpendicular to the magnetic field.

22. A device according to claim 19, wherein the movable part includes two coil forms having relatively perpendicular deflection axes and each form is shaped as a portion of a sphere.

23. A device according to claim 22, wherein a fixed magnetic core shaped as a portion of a sphere with optical duct perforated therein is mounted within the said pair of spherical forms.

References Cited in the file of this patent

UNITED STATES PATENTS

| | | |
|---|---|---|
| 1,740,130 | Voss et al. | Dec. 17, 1929 |
| 2,206,086 | Gaylon | July 2, 1940 |